US007477964B2

(12) United States Patent
Graushar et al.

(10) Patent No.: US 7,477,964 B2
(45) **Date of Patent: *Jan. 13, 2009**

(54) COMBINED MAILING STREAMS

(75) Inventors: William Graushar, Wauwatosa, WI (US); John Geres, West Allis, WI (US)

(73) Assignee: Quad/Graphics, Inc., Sussex, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/959,683

(22) Filed: Dec. 19, 2007

(65) Prior Publication Data

US 2008/0097643 A1 Apr. 24, 2008

Related U.S. Application Data

(63) Continuation of application No. 11/380,667, filed on Apr. 28, 2006, now Pat. No. 7,333,878, and a continuation of application No. 10/262,116, filed on Oct. 1, 2002, now Pat. No. 7,096,088.

(60) Provisional application No. 60/326,324, filed on Oct. 1, 2001.

(51) Int. Cl.
*G06F 7/00* (2006.01)

(52) U.S. Cl. ...................... 700/223; 700/220; 270/1.02; 270/1.03; 270/52.02

(58) Field of Classification Search ................ 270/1.01, 270/1.02, 1.03, 52.02; 700/219, 220, 221, 700/223, 224, 226, 227; 53/284.3
See application file for complete search history.

(56) References Cited

U.S. PATENT DOCUMENTS

| | | | | | |
|---|---|---|---|---|---|
| 4,149,711 | A * | 4/1979 | Jackson | ...................... | 270/1.02 |
| 4,789,147 | A * | 12/1988 | Berger et al. | ............... | 270/1.03 |
| 5,114,128 | A * | 5/1992 | Harris et al. | ............... | 270/1.03 |
| 5,314,176 | A * | 5/1994 | Schmitt | ...................... | 270/1.03 |
| 5,317,654 | A * | 5/1994 | Perry et al. | ................. | 382/101 |
| 5,326,087 | A * | 7/1994 | Colson et al. | ............ | 270/58.02 |
| 5,547,175 | A * | 8/1996 | Graushar et al. | .............. | 270/37 |
| 5,818,724 | A * | 10/1998 | Brewster et al. | ............ | 700/220 |
| 6,167,326 | A * | 12/2000 | Graushar et al. | ............ | 700/223 |
| 6,192,295 | B1 * | 2/2001 | Gunther | ...................... | 700/225 |
| 7,096,088 | B2 | 8/2006 | Graushar et al. | | |
| 7,133,851 | B1 * | 11/2006 | Benson | ....................... | 705/410 |

* cited by examiner

*Primary Examiner*—Gene O. Crawford
*Assistant Examiner*—Ramya G Prakasam
(74) *Attorney, Agent, or Firm*—Michael Best & Friedrich LLP

(57) ABSTRACT

A method including assembling printed products to form a first mail stream on a finishing line, providing a second mail stream of printed products to the finishing line, and combining the first and second mail streams on the finishing line.

48 Claims, 1 Drawing Sheet

COMBINED MAILING STREAMS

CROSS-REFERENCE TO RELATED APPLICATIONS

This Application is a continuation of U.S. patent application Ser. No. 11/380,667 filed Apr. 28, 2006, which is a continuation of U.S. patent application Ser. No. 10/262,116 filed Oct. 1, 2002, now issued U.S. Pat. No. 7,096,088, which claims the priority benefit under 35 U.S.C. §119(e) of the U.S. Provisional Patent Application No. 60/326,324 filed on Oct. 1, 2001. The contents of these applications are hereby incorporated by reference herein.

BACKGROUND

With increasing postal costs and rates, printers and publishers are looking for ways to mail printed products more cost effectively. Combining two or more titles into one mail stream is one way to achieve postal savings. However, the combination of two or more mail streams in a production setting has proven complex and difficult.

SUMMARY

According to one embodiment, the present invention is directed to a method including assembling printed products to form a first mail stream on a finishing line, providing a second mail stream of printed products to the finishing line, and combining the first and second mail streams on the finishing line.

According to another embodiment, the present invention is directed to a method including providing a first mailing list including a first sequence of recipients corresponding to first printed products of a first mail stream, providing a second mailing list including a second sequence of recipients corresponding to second printed products of a second mail stream, and combining the first and second mailing lists into a master mailing list.

According to yet another embodiment, the present invention is directed to a method including providing a master mailing list including a sequence of recipients, assembling products to form a first mail stream on a finishing line, providing a second mail stream of products to the finishing line, and combining the first and second mail streams in the sequence of the master mailing list on the finishing line.

According to another embodiment, the present invention is directed to a method including providing a plurality of pockets on a finishing line, the plurality of pockets including printed pieces corresponding to a first title and a second title, and simultaneously assembling the first title and the second title on the finishing line.

Figure 1:
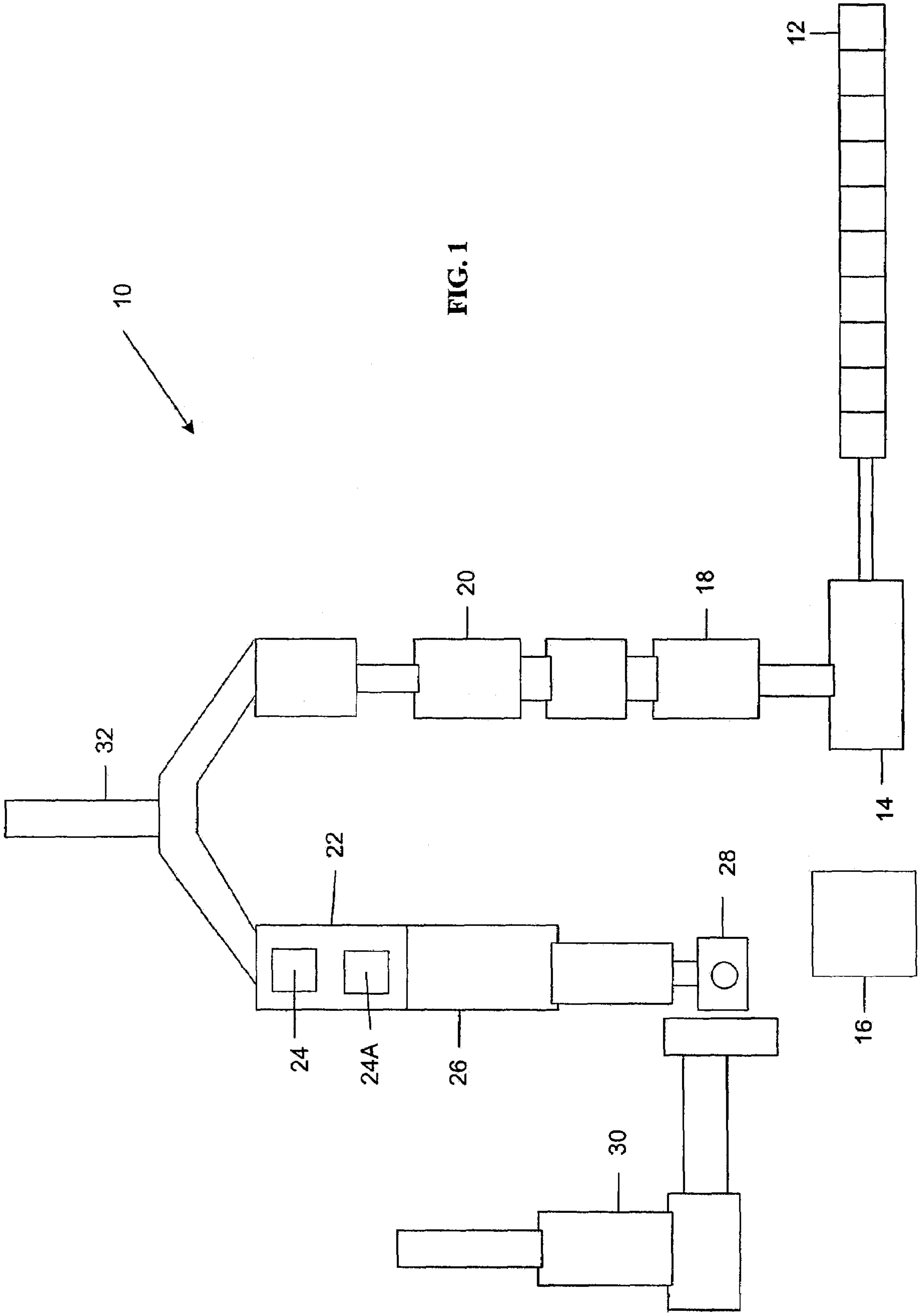
FIG. 1 is a schematic of the finishing process of the present invention.

Before one embodiment of the invention is explained in detail, it is to be understood that the invention is not limited in its application to the details of construction and the arrangement of components set forth in the following description or illustrated in the drawing. The invention is capable of other embodiments and of being practiced or being carried out in various ways. Also, it is to be understood that the phraseology and terminology used herein is for the purpose of description and should not be regarded as limiting.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The invention includes a method for combining at least two separate mail streams in a finishing process. In one embodiment, one mail stream is from a stitcher and the other mail stream is from a shuttle hopper. However, it should be noted that the mail steams can be from other pieces of finishing equipment or from other manufacturing lines as will be detailed below.

With reference to FIG. 1, a finishing line 10 is illustrated to manufacture bound printed products such as books, magazines, catalogs, direct mail pieces and the like. The finishing line 10 includes a series of pockets 12 to feed printed pieces to the finishing line 10 to create a first mail stream. The number of pockets 12 varies depending upon the title or titles to be bound on the finishing line 10. A stitcher 14, such as a saddle stitcher, then binds the individual printed pieces together. However, it should be noted that other types of binders and other methods of binding the printed products can be utilized with the present invention such as a perfect binder.

The feeding of the printed pieces to the finishing line 10 is controlled by a controller 16 such as the FCS controller available from QTI of Sussex, Wis. The controller 16 assembles the printed products according to a master mailing list of recipients. The assembly can be demographic such that the controller 16 assembles a printed product based upon individual recipient information, as is known in the art. Further, the controller 16 may control the simultaneous assembly of more than one title or version of the printed products using the pockets 12 and stitcher 14, a process termed multi-binding. For example, two titles can be simultaneously assembled and bound using the same set of pockets 12 and stitcher 14. The two titles would be assembled according to a master mailing list in a specific order to obtain optimum postal discounts. Three or more titles could also be assembled using this multi-binding process.

After binding, the printed products are conveyed to and trimmed by a trimmer 18. After the trimmer 18, this first mail stream enters a buffer storage system or buffer 20. The buffer 20 is preferably a conveyor type buffer such as that available from Sitma of Italy as model 953 and preferably can hold 100-400 printed products. The buffer 20 holds then delivers the printed products to a mail table 22 as needed and as controlled by the controller 16 as will be further explained below.

Preferably, a second mail stream enters the finishing line 10 at the mail table 22 via a loader such as a shuttle hopper 24. It should be noted that other types of equipment could be utilized to deliver the second mail stream to the mail table 22.

The shuttle hopper 24 feeds the printed products of the second mail stream to the same mail table 22 where printed products of the first mail stream are delivered. The second mail stream includes already bound printed products that may or may not be pre-addressed. If pre-addressed, optionally a verification step can occur during which each printed product is checked to make sure the address indicia thereon is the same address indicia for the printed product in that sequence position according to the master mailing list.

The two mail streams are combined at the mail table 22 so an intended master mailing list sequence is produced. The master mailing list sequence includes the recipients of both mail streams. Such a combination of two mail streams is designed to increase postal discounts and/or reduce the postal rates on the combined mail stream. The sequence of the master mailing list is known to the controller 16. The controller 16 controls the assembly of the printed products of the first mail stream and controls the feeding of the printed products of the second mail stream to the mail table 22. Thereby, at the mail table 22, the two streams are combined in the proper order according to the master mailing list sequence. The sequence determines whether the buffer 20 or the shuttle hopper 24 delivers an individual printed product to the mail table 22.

When the printed products of the first mail stream exit the buffer 20, the controller 16 instructs the buffer 20 to leave gaps in the stream, i.e., empty chain slots, into which printed products of the second mail stream will be placed at the mail table 22. The controller 16 and the buffer 20 operate together to feed the printed products of the first mail stream to the mail table 22 when needed according to the master mailing list. The mail table 22 therefore runs at a faster average speed than the stitcher 14 to accommodate both mail streams. The number of printed products of the second mail stream delivered to the mail table 22 from the shuttle hopper 24 and into the gaps determines this increased speed.

The buffer 20 has a varying output from that of its input. Printed products can be introduced into the buffer 20 without any printed products being removed from it. The opposite is also true in that printed products can be removed from the buffer 20 without any being introduced. The buffer 20 retains the printed products of the first mail stream in the order they were sent into the buffer in a first in, first out arrangement. As an output, the buffer creates the empty chain slots into which printed products of the second mail stream will be placed at the mail table 22. The buffer 20 operates at varying speeds depending upon input and output requirements which are governed by the need to deliver a particular printed product to the mail table 22 at the correct time as controlled by the controller 16.

The resulting mail stream exiting the mail table 22 is a combination of the first mail stream from the stitcher 14 and the second mail stream from the shuttle hopper 24, with that combination being in the sequence determined by the master mailing list.

Optionally, a second mail table 26 or an extension of the mail table 22 can be used to apply address indicia to the printed products of the combined mail stream. The printed products in the combined mail stream are then conventionally accumulated in a stacker 28 and bundled in the bundle wrapper 30.

With this process, if the stitcher 14 goes down or there are other problems assembling the first stream of printed products, the finishing process can continue functioning with the printed products in the buffer 20 rather than shutting down the entire finishing line. This results in increased efficiency and cost savings especially if the problem can be remedied prior to the buffer 20 running out of printed products.

It should be noted that other layouts of combining two mail streams are covered by the invention. For example, printed products could be diverted to another packaging process which could include the buffer 20 and shuttle hopper 24 or like components. In another example, two buffers 20 can be linked together in series to create increased buffer capacity for the printed products of the first mail stream, such as 200-800 printed products.

It should also be noted that multiple shuttle hoppers 24 feeding printed products to the mail table 22 can be employed to combine more than two mail streams. For example, a second shuttle hopper 24A could feed a third stream of printed products to the mail table 22.

In another embodiment of the invention, the empty chain slots that are created in the embodiment described above are temporarily utilized in the assembly of another mail stream. Specifically, the controller 16 using the master mail list sequence determines where empty chain slots need to be created into which printed products from the second mail stream will be placed by the shuttle hopper 24 at the mail table 22. The controller 16 then controls the assembly of another stream of printed products with each printed product being placed temporarily into one of the empty chain slots. The printed products of this mail stream are then diverted from the finishing line 10 prior to the mail table 22 thus making the empty chain slots available for the printed products of the second mail stream, such as, for example, at a divert gate 32.

This process is particularly suited for the assembly of a newsstand version of a printed product which would have no recipient or address information associated with it and would therefore need to be in no particular sequence. Typically, the newsstand version of a title is created on the finishing line 10 either before or after subscriber versions, thus taking up additional time and resources. In the process described herein, the newsstand version is assembled and positioned at each empty chain slot position and then diverted prior to the mail table 22, thus saving time and resources in production.

What is claimed is:

1. A method comprising:

providing a master mailing list comprising a sequence of recipients;

assembling products to form a first mail stream on a finishing line;

providing a second mail stream of products to the finishing line; and combining the first and second mail streams in the sequence of the master mailing list on the finishing line.

2. The method of claim 1 and further comprising the act of printing address indicia on at least a portion of the printed products of the combined mail stream.

3. The method of claim 1 wherein the first mail stream is assembled using pockets and a binder.

4. The method of claim 3, wherein the binder is a saddle stitcher.

5. The method of claim 3, wherein the binder is a perfect binder.

6. The method of claim 1 wherein a loader provides the second mail stream to the finishing line.

7. The method of claim 6 wherein the loader is a shuttle hopper.

8. The method of claim 1 wherein the first and second mail streams are combined on a mail table.

9. The method of claim 1 and further comprising the acts of stacking and bundling the combined mail stream.

10. The method of claim 1 wherein the first mail stream comprises at least two different titles.

11. The method of claim 1 wherein the first mail stream comprises at least two different versions of a printed product.

12. The method of claim 1 and further comprising the act of feeding a third stream of products to the finishing line.

13. The method of claim 1 wherein the printed products of the second mail stream are pre-addressed.

14. The method of claim 1, wherein combining the first and second mail streams comprises combining the first and second mail streams using a buffer.

15. The method of claim 1, wherein combining the first and second mail streams comprises combining the first and second mail streams without the use of a buffer.

16. A method comprising:

providing a first data list comprising a first sequence of recipients corresponding to first printed products of a first mail stream;

providing a second data list comprising a second sequence of recipients corresponding to second printed products of a second mail stream;

combining the first and second data lists into a master mailing list.

17. The method of claim 16, further comprising:

assembling printed products to form the first mail stream on a finishing line;

providing the second mail stream of printed products to the finishing line; and combining the first and second mail streams in the sequence of the master mailing list on the finishing line.

18. The method of claim 16, wherein the data list is a mailing list.

19. The method of claim 18, wherein combining the first and second mailing lists comprises combining the first and second mailing lists in a recipient-based order.

20. The method of claim 18, wherein combining the first and second mailing lists comprises combining the first and second mailing lists in an address-based order.

21. A method comprising:

assembling products to form a first mail stream on a finishing line;

providing a second mail stream of products to the finishing line; and combining the first and second mail streams on the finishing line.

22. The method of claim 21, wherein the products are printed products.

23. The method of claim 22, wherein the printed products are one of books, magazines, catalogs, and direct mail pieces.

24. The method of claim 21, further comprising combining the first and second mail streams according to a recipient-based order.

25. The method of claim 21 and further comprising the act of printing address indicia on at least a portion of the products of the combined mail stream.

26. The method of claim 21 wherein the first mail stream is assembled using pockets and a binder.

27. The method of claim 21 wherein a loader provides the second mail stream to the finishing line.

28. The method of claim 27 wherein the loader is a shuttle hopper.

29. The method of claim 21 wherein the first and second mail streams are combined on a mail table.

30. The method of claim 21 and further comprising the acts of stacking and bundling the combined mail stream.

31. The method of claim 21 wherein the first mail stream comprises at least two different titles.

32. The method of claim 21 wherein the first mail stream comprises at least two different versions of a product.

33. The method of claim 21 and further comprising the act of feeding a third stream of products to the finishing line.

34. The method of claim 21 wherein the printed products of the second mail stream are pre-addressed.

35. A method comprising:

providing a plurality of pockets on a finishing line, the plurality of pockets comprising printed pieces corresponding to a first title and a second title; and simultaneously assembling the first title and the second title on the finishing line.

36. The method of claim 35, wherein providing the plurality of pockets comprises providing the plurality of pockets on a binding line.

37. The method of claim 35, wherein the first and second titles have no overlapping printed pieces.

38. The method of claim 35, further comprising:

feeding the printed pieces corresponding to the first title to the finishing line and feeding the printed pieces corresponding to the second title to the finishing line.

39. The method of claim 35, further comprising:

binding the printed pieces corresponding to the first title with a binder and binding the printed pieces corresponding to the second title with the binder.

40. The method of claim 39, wherein the binder is a saddle stitcher.

41. The method of claim 39, wherein the binder is a perfect binder.

42. The method of claim 35, further comprising:

providing the plurality of pockets with printed pieces corresponding to a third title; and simultaneously assembling the first title, the second title, and the third title on the finishing line.

43. The method of claim 35, further comprising:

feeding the printed pieces corresponding to the first title to the finishing line and feeding the printed pieces corresponding to the second title to the finishing line; and binding the printed pieces corresponding to the first title with a binder and binding the printed pieces corresponding to the second title with the binder.

44. The method of claim 35, further comprising:

conveying the first and second titles to a trimmer; and trimming the first and second titles by the trimmer.

45. The method of claim 35, further comprising:

providing a master mailing list comprising a sequence of recipients; and simultaneously assembling the first title and the second title on the finishing line to form a first mail stream in the sequence of the master mailing list on the finishing line.

46. The method of claim 45, wherein the sequence of the master mailing list is recipient-based.

47. The method of claim 45, wherein the sequence of the master mailing list is address-based.

48. The method of claim 45, further comprising:

providing a second mail stream of printed products to the finishing line; and combining the first and second mail streams in the sequence of the master mailing list on the finishing line.

* * * * *